(12) United States Patent
Cheng

(10) Patent No.: US 8,334,672 B2
(45) Date of Patent: Dec. 18, 2012

(54) CHARGING CIRCUIT WITH ABILITY TO IDENTIFY POWER SOURCE

(75) Inventor: Cheng-Tao Cheng, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 310 days.

(21) Appl. No.: 12/764,200

(22) Filed: Apr. 21, 2010

(65) Prior Publication Data
US 2011/0148348 A1 Jun. 23, 2011

(30) Foreign Application Priority Data

Dec. 22, 2009 (TW) ................................ 98144345 A

(51) Int. Cl.
*H02J 7/00* (2006.01)
(52) U.S. Cl. ....................................................... 320/107
(58) Field of Classification Search .................... 320/107
See application file for complete search history.

(56) References Cited

U.S. PATENT DOCUMENTS

| | | | |
|---|---|---|---|
| 2001/0017531 A1* | 8/2001 | Sakakibara et al. | 320/106 |
| 2005/0144495 A1* | 6/2005 | Nakajima et al. | 713/340 |
| 2005/0174094 A1* | 8/2005 | Purdy et al. | 320/134 |
| 2008/0177908 A1* | 7/2008 | Hanson et al. | 710/16 |

* cited by examiner

*Primary Examiner* — Arun Williams
(74) *Attorney, Agent, or Firm* — Altis Law Group, Inc.

(57) ABSTRACT

A charging circuit used to identify a power source connected to a portable electronic device includes a connector, an identifying circuit, and a central processing unit. The connector includes a voltage bus contact, a ground contact, a positive data contact and a negative data contact. The identifying circuit is connected to the positive data contact or the negative data contact to identify the power source and generates a configuration signal. The central processing unit receives the configuration signal and operates a corresponding charging mode.

4 Claims, 3 Drawing Sheets

CHARGING CIRCUIT WITH ABILITY TO IDENTIFY POWER SOURCE

BACKGROUND

1. Technical Field

The disclosure generally relates to charging circuits, particularly to a charging circuit for identifying a power source for charging a portable electronic device.

2. Description of Related Art

Most portable electronic devices can be charged by connecting the device to power source such as a computer or an adapter having a USB connector. However, electrical current supplied by the adapter may be a different level than supplied by the computer. Each portable electronic device must be able to identify the current level and adjust the charging mode correspondingly or risk damage.

BRIEF DESCRIPTION OF THE DRAWINGS

Many aspects of the charging circuit can be better understood with reference to the following drawings. The components in the drawings are not necessarily drawn to scale, the emphasis instead being placed upon clearly illustrating the principles of the charging circuit.

DETAILED DESCRIPTION

Figure 1:
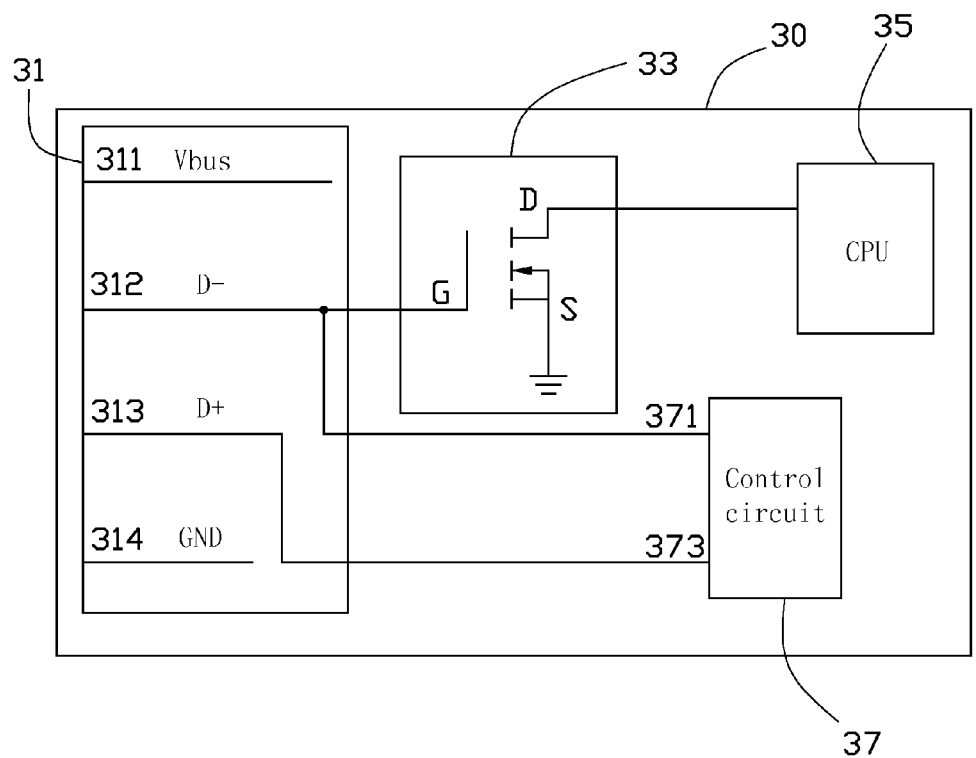
FIG. 1 is a schematic view of a charging circuit, according to an exemplary embodiment.

FIG. 1 shows a charging circuit 30 used with a portable electronic device such as a mobile phone or a personal digital assistant (PDA) to identify a power source such as an adapter or a computer connected thereto, according to one exemplary embodiment. The charging circuit 30 includes a connector 31, an identifying circuit 33, a central processing unit (CPU) 35, and a control circuit 37.

Figure 2:
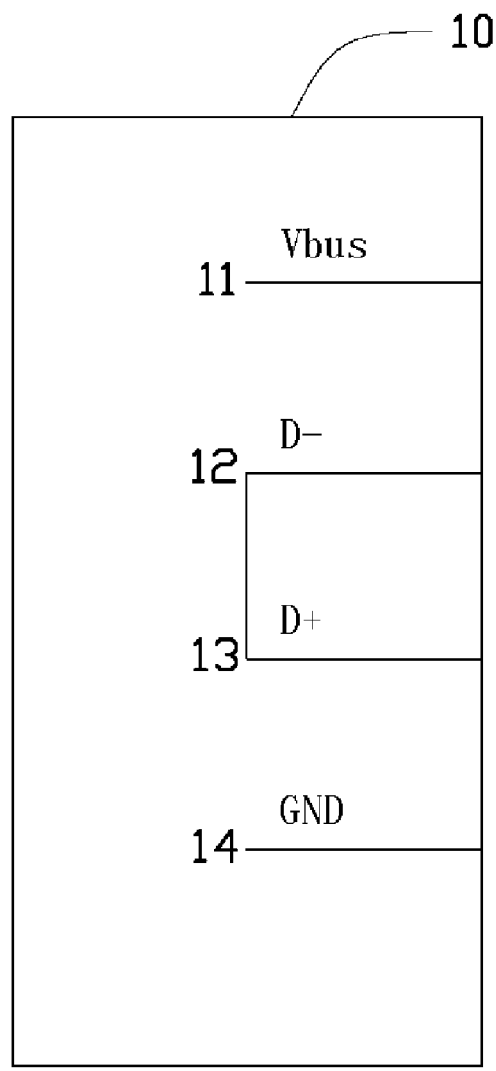
FIG. 2 is a schematic view of a connector of a conventional adapter.

Referring to FIG. 2, a connector 10 of the adapter includes a voltage bus (Vbus) contact 11, a positive data (D+) contact 12, a negative data (D−) contact 13, and a ground (GND) contact 14. The Vbus contact 11 is configured to output electrical power. The D+ contact 12 is connected to the D− contact 13. The GND contact 14 is connected to ground.

Figure 3:
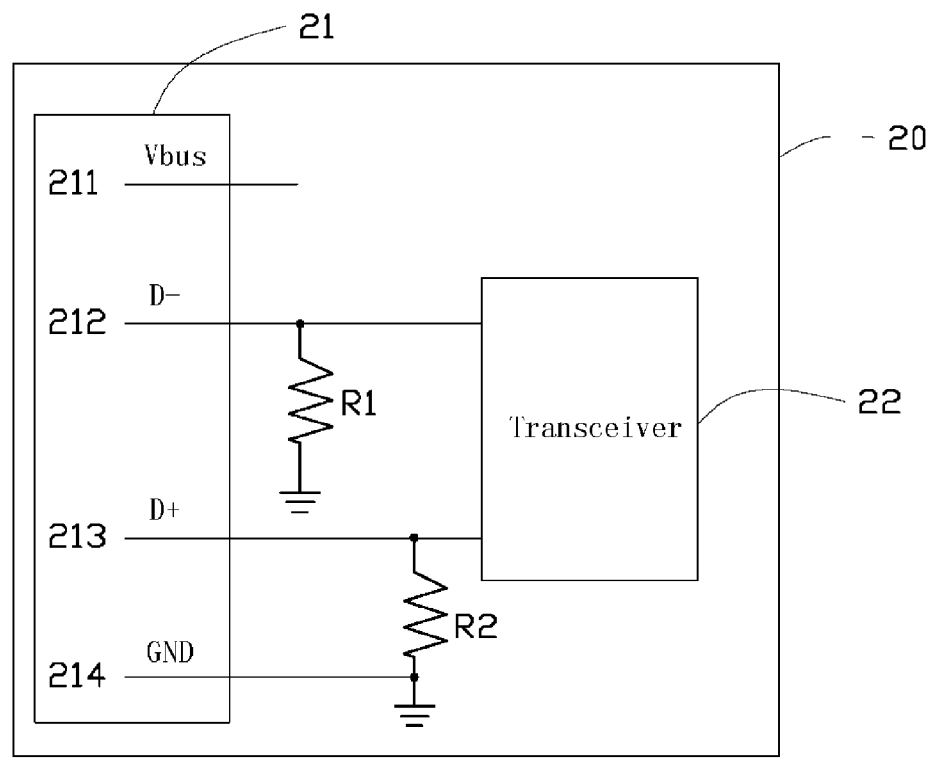
FIG. 3 is a schematic view of a circuit of a computer used to charge a portable electronic device.

Referring to FIG. 3, a circuit 20 of a computer used as a power source for charging the portable electronic device includes a connector 21, two resistors R1, R2, and a transceiver 22. The connector 21 includes a Vbus contact 211, a D+ contact 212, a D− contact 213, and a GND contact 214. One end of each resistor R1, R2 is respectively connected to the D− contact 212, and the D+ 213. Another end of each resistor R1, R2 is connected to ground. The transceiver 22 is connected to the D− contact 212 and the D+ contact 213 to establish a communication between the circuit 20 and other electronic devices. A signal that swings from high (low) to low (high), such as a square wave signal, can be sent from the D− contact 212 and the D+ contact 213 to other electronic devices.

Also referring to FIG. 1, the connector 31 includes a Vbus contact 311, a D− contact 312, a D+ contact 313, and a GND contact 314. The connector 31 corresponds to and can be connected to the connector 10 of the adapter and the connector 21 of the computer. The Vbus contact 311 is configured to input electrical power to the portable electronic device. The GND contact 314 is connected to ground (not shown). In this embodiment, the identifying circuit 33 is an N-channel type metal-oxide-semiconductor field effect transistor (MOSFET). The gate of the MOSFET is connected to the D− contact 312. The source of the MOSFET is connected to ground. The drain of the MOSFET is connected to the CPU 35. The identifying circuit 33 receives a signal from the D− contact 312 of the connector 31 and generates a configuration signal according to the received signal. In other embodiments, the gate of the MOSFET can be connected to the D+ contact 313 of the connector 31. The identifying circuit 33 receives a signal from the D− contact 313 of the connector 31. The CPU 35 receives the configuration signals from the identifying circuit 33 and operates a corresponding charging mode. The control circuit 37 includes two contacts 371, 373 respectively connecting to the D− contact 312 and the D+ contact 313 of the connector 31. When the D− contact 312 is connected to the D+ contact 313, the control circuit 37 sets a voltage of the D− contact 312 and the D+ contact 313 to be high such as more than 5V.

In use, if the adapter is connected to the charging circuit 30, the D− contact 312 connects to the D+ contact 313 via the adapter, and the control circuit 37 sets the voltage of the D− contact 312 and the D+ contact 313 to be high, and the MOSFET is switched on. The CPU 35 receives a configuration signal from the drain of the MOSFET that is maintained at low such as 5V, and identifies the power source as an adapter.

If the computer is connected to the charging circuit 30. The D− contact 212 and the D+ contact of the connector 21 are respectively connected to the D+ contact 312 and the D− contact 313 of the connector 31 to establish communication therebetween. The drain of the MOSFET receives the signal that swings from high (low) to low (high) such as a square wave signal from the D+ contact 313, and the MOSFET is correspondingly switched on/off. The CPU 35 receives a configuration signal that swings from high (low), and identifies the power source as a computer.

The charging circuit 30 can identify the power source connected thereto as an adapter or a computer by the configuration signal generated by the identifying circuit 33 and operate a corresponding charging mode using the CPU 35 that is suitable for the amount of charging current. Applying the present charging circuit 30 in an electronic device will protect the device from damage due to charging and is a simple low-cost application.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A charging circuit for identifying a power source connected to a portable electronic device, comprising:
    a connector configured for directly connecting to the power source, the connector having a voltage bus contact, a ground contact, a positive data contact and a negative data contact;
    an identifying circuit connected to the positive data contact or the negative data contact to identify the power source as a computer or an adapter and generating a configuration signal; and
    a central processing unit directly connected to the identifying circuit, the central processing unit receiving the configuration signal and operating in a corresponding charging mode according to the configuration signal; wherein the identify circuit is a MOSFET, a gate of the MOSFET connects to the positive data contact or the negative data contact of the connector, a source of the MOSFET connects ground, a drain of the MOSFET connects to the central processing unit, when the power supply is identified as the computer, the MOSFET is alternatively switched on and off; when the power supply is identified as the adapter, the MOSFET is always switched on or off.

2. The charging circuit as claimed in claim 1, wherein if the central processing unit receives a configuration signal that swings from high (low) to low (high), the central processing unit identifies the power source as the computer.

3. The charging circuit as claimed in claim 1, wherein if the central processing unit receives a configuration signal which is maintained at low, the central processing unit identifies the power source as the adapter.

4. The charging circuit as claimed in claim 1, further comprising a control circuit connected to the negative data contact and the positive data contact, wherein when the connector connects to the adapter, the negative data contact is connected to the positive data contact via the adapter, the control circuit set the negative data contact or the positive data contact to be high/low as the configuration signal.

* * * * *